(12) United States Patent
Chonavel et al.

(10) Patent No.: US 7,051,479 B2
(45) Date of Patent: *May 30, 2006

(54) ATTACHING A CABLE DRUM AND DRIVE TO A VEHICLE DOOR

(75) Inventors: Sylvain Chonavel, Thury Harcourt (FR); Jean-Marc Belmont, Jean le Blanc (FR); Pascal De Vries, Sandillon (FR); Yi-Hwa Chu, Ouzouer sur Loire (FR); Frederic Burkat, Bouzy la Foret (FR)

(73) Assignee: ArvinMeritor Light Vehicle Systems - France, Sully-sur-Lorie (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 10 days.

(21) Appl. No.: 10/392,364

(22) Filed: Mar. 19, 2003

(65) Prior Publication Data

US 2004/0010975 A1    Jan. 22, 2004

(30) Foreign Application Priority Data

Mar. 19, 2002  (FR) .................................. 02 03372

(51) Int. Cl.
*E06B 3/00* (2006.01)
(52) U.S. Cl. .......................................... 49/506; 49/352
(58) Field of Classification Search .................. 49/506, 49/502, 352, 349, 348
See application file for complete search history.

(56) References Cited

U.S. PATENT DOCUMENTS

| 4,403,450 | A | * | 9/1983 | Ishii ............................. 49/352 |
| 4,970,911 | A | * | 11/1990 | Ujihara et al. ......... 74/501.5 R |
| 5,074,077 | A | * | 12/1991 | Toyoshima et al. ........... 49/352 |
| 5,778,600 | A | * | 7/1998 | Chu ............................ 49/352 |

(Continued)

FOREIGN PATENT DOCUMENTS

DE          196 11 074          9/1997

(Continued)

*Primary Examiner*—Gregory J. Strimbu
(74) *Attorney, Agent, or Firm*—Carlson, Gaskey & Olds

(57) ABSTRACT

A vehicle door is assembled by immobilizing a cable drum with a wedge and then coupling the wedged drum to a drive member. A cable is wound onto the drum either before or after the positioning of the wedge. The A drive member is then coupled to the wedged drum. After coupling, the drive member is fixed to the vehicle door. The window guide structure can also be inserted between the inner panel and an outer panel of the vehicle door. The wedge can be removed from the window guide structure, or alternately, the wedge can be fixed to the window guide structure. Alternately, the method further includes the steps of placing the cable in deflection pulleys before the steps of positioning the wedge and winding the cable. The drive member is pivotally mounted to the inner panel about an axis offset relative to the rotational axis of the drum, and the cable is tensioned by pivoting the drive member about the offset axis. The drive member is then fixed to the inner panel of the vehicle door. Essentially, a pre-assembled intermediate window drive is created that facilitates mounting to the vehicle door.

12 Claims, 3 Drawing Sheets

U.S. PATENT DOCUMENTS

| | | | |
|---|---|---|---|
| 5,857,635 A * | 1/1999 | Klippert | 242/407 |
| 5,907,897 A * | 6/1999 | Hisano | 29/434 |
| 5,964,063 A * | 10/1999 | Hisano et al. | 49/502 |
| 6,141,910 A | 11/2000 | Kobrehel et al. | |
| 6,256,929 B1 * | 7/2001 | Serrano et al. | 49/352 |
| 6,553,718 B1 * | 4/2003 | Arquevaux et al. | 49/352 |
| 6,796,085 B1 * | 9/2004 | Smith | 49/352 |
| 2002/0083647 A1 * | 7/2002 | Bostian et al. | 49/352 |
| 2003/0029092 A1 * | 2/2003 | Bertolini et al. | 49/352 |
| 2005/0011130 A1 * | 1/2005 | Klipper et al. | 49/352 |

FOREIGN PATENT DOCUMENTS

| | | |
|---|---|---|
| EP | 0 384 019 | 8/1990 |
| FR | 2 815 994 | 5/2002 |

* cited by examiner

ATTACHING A CABLE DRUM AND DRIVE TO A VEHICLE DOOR

This application claims priority to French patent application FR 02 03 372 filed on Mar. 19, 2002.

BACKGROUND OF THE INVENTION

The invention relates generally to a method of assembling a vehicle door by immobilizing a cable drum with a wedge and then coupling the wedged drum to a drive member.

In a prior art method of assembling a vehicle door, a vehicle door frame is first secured to a fixture that retains the door frame in a secured position. A motorized double-lift drive member is then fixed to the retained door frame. Cables encased in plastics sheaths are then connected to the fixed drive member. A window is then mounted on runs connected to the cables. The assembly is then slid into and fixed to the vehicle door. This prior art method of assembling a vehicle door has been used in the Audi A4.

There are several drawbacks to the prior art method of assembling a vehicle door. For one, the drive member is located in a zone of the vehicle door partially exposed to moisture. Thus, expensive watertight connectors have been required. Additionally, corrosion-induced wear of the cables can occur, particularly if moisture enters the plastic sheaths. Finally, the plastic sheaths themselves reduce the drive efficiency of the drive member and add to the expense of the vehicle door.

Hence, there is a need in the art for an improved method of assembling a vehicle door that is less expensive and overcomes the drawbacks of the prior art.

SUMMARY OF THE INVENTION

The present invention relates to a method of assembling a vehicle door by immobilizing a cable drum with a wedge and then coupling the wedged drum to a drive member.

The vehicle door assembled by the method of the present invention includes a window guide structure and a cable drum. The window guide structure includes a guide frame having a guide slot. A wedge is positioned between the guide frame of the window guide structure and the drum, fixing the drum on the vehicle door structure. The drum is fixed in the longitudinal direction and vertical direction of the window. The wedge can also allow deflection of the drum a direction transverse to the vehicle door. A cable is wound onto the drum either before or after the wedge is positioned between the window guide frame and the drum.

Essentially, the invention to this point provides a pre-assembled window drive including the window guide structure, the drum, the wedge, the cable, etc. This pre-assembled structure is then taken and mounted to a vehicle door.

A drive member is then coupled to the wedged drum. After coupling, the drive member is then fixed to an inner panel of the vehicle door. Alternately, the window guide structure is inserted between the inner panel and an outer panel of the vehicle door, and then the drive member is fixed to the inner panel. After the drive member is fixed to the inner panel of the vehicle door, the wedge can be removed or fixed to the window guide structure to form a part of the drum housing.

Alternately, the drive member is a motorized reducer, and the method further includes the steps of placing the cable in deflection pulleys of the window guide structure before the steps of positioning the wedge and winding the cable on the drum. During the step of fixing the drive member to the inner panel, the motorized reducer is pivotally mounted to the inner panel about an axis that is staggered relative to the rotational axis of the drum. The cable is then tensioned by pivoting the motorized reducer about the staggered axis. The motorized reducer is fixed to the inner panel of the vehicle door.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawing that accompany the detailed description can be briefly described as follows.

DETAILED DESCRIPTION OF THE PREFERRED EMBODIMENT

Figure 1:
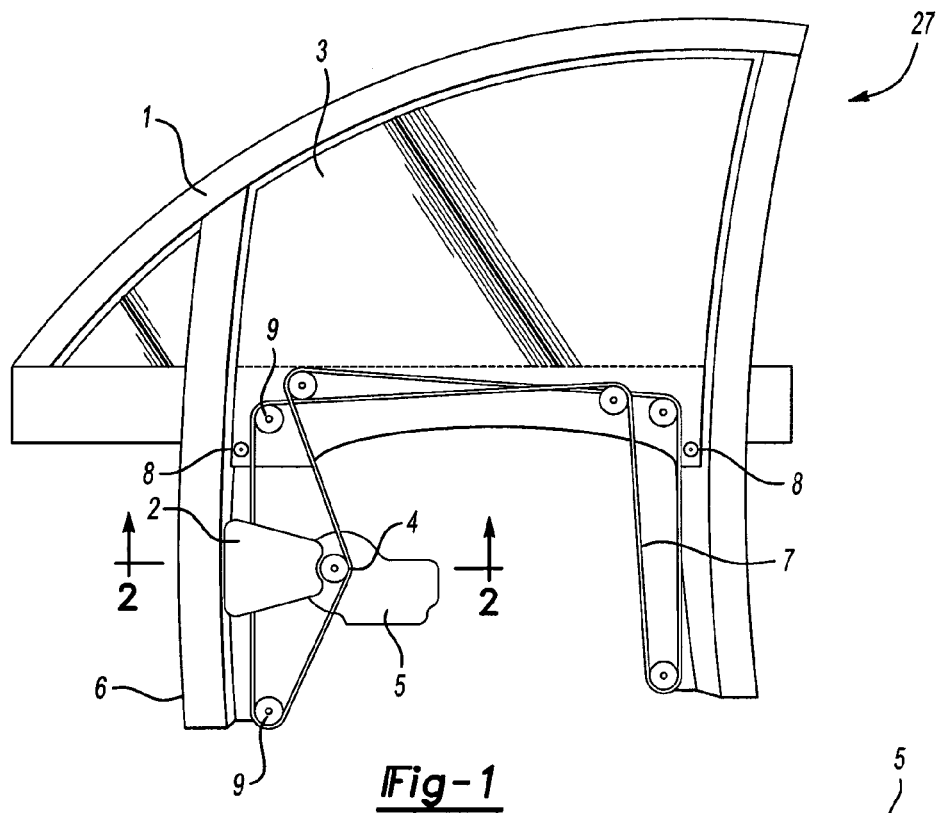
FIG. 1 shows a front view of a window guide structure of a vehicle door.

FIG. 1 shows a window guide structure 1 of a vehicle door 27. The window guide structure 1 includes a guide frame 6 having a window guide slot 26 (shown in FIG. 2), such as a window run. A window 3 is mounted in sliding arrangement in the window guide slot 26. A cable 7 is fixed to the window 3 by fasteners 8, as known in the art. The cable 7 passes through six cable deflection pulleys 9 disposed on the window guide structure 1 to form a circuit, which is also known in the art.

A wedge 2 is positioned between the window guide structure 1 and a cable drum 4, securing and immobilizing the cable drum 4. The wedge 2 can also be positioned between the window guide structure 1 and an intermediate part that is disposed between the wedge 2 and the cable drum 4, such as a drum casing. Also, a drum supporting plate 21 of the cable drum 4 is also received in the wedge 2.

Figure 2:
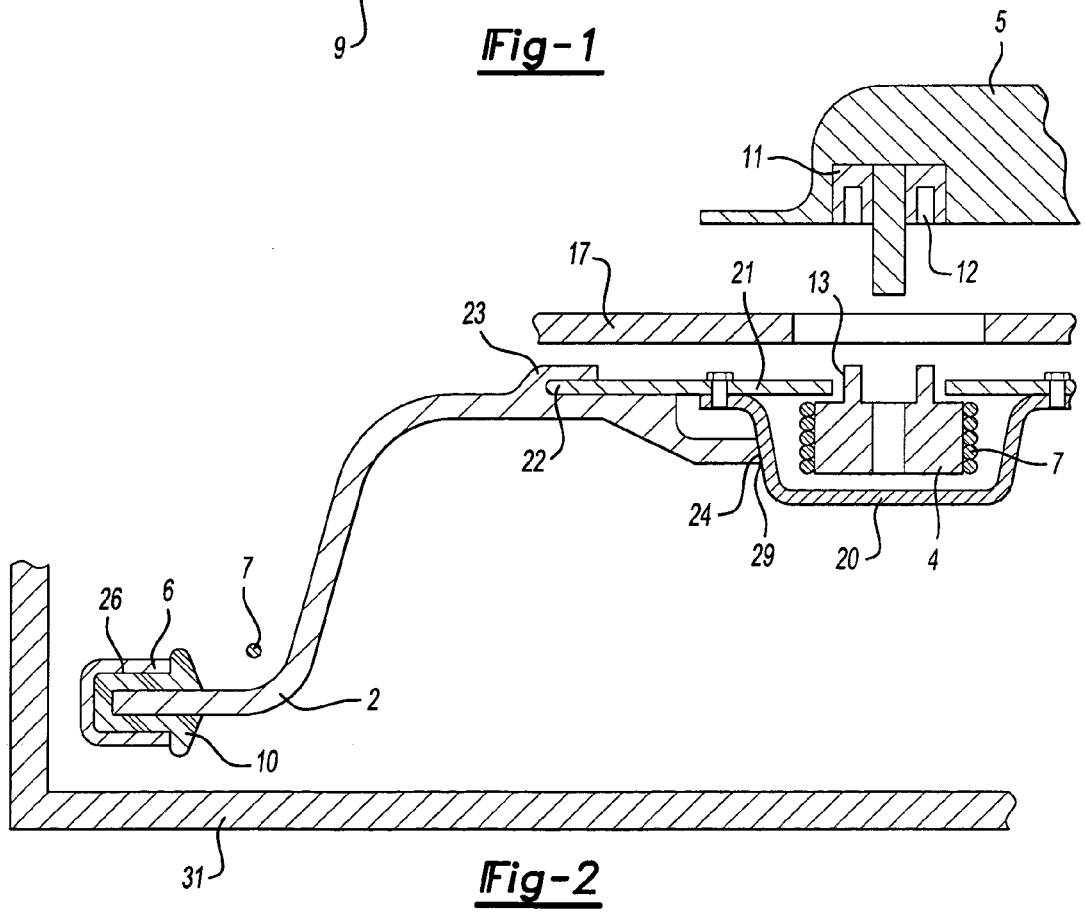
FIG. 2 shows a cross-sectional view of the window guide structure of FIG. 1.

As shown in FIG. 2, an edge of the wedge 2 is received in the window guide slot 26 and secured in the window guide slot 26 either by friction or by elastic deformation. For example, the guide frame 6 can include an elastomer seal 10 that secures the wedge 2 by elastic deformation.

The wedge 2 fixes the cable drum 4 in the longitudinal direction and the vertical direction relative to the window 3 without the use of cable sheaths. The wedge 2 is removable, and can be withdrawn once the cable drum 4 is immobilized.

The cable 7 is wound onto the cable drum 4 either before or after the wedge 2 is positioned between the window guide structure 1 and the cable drum 4. When the cable 7 is tightened, the cable drum 4, by the drum supporting plate 21, applies a compressive force to the wedge 2, securing the wedge 2 between the guide frame 6 of the window guide structure 1 and the cable drum 4. Therefore, during assembly, the window guide structure 1 can be transported to a vehicle door assembly bay without displacement of the wedge 2 or the cable drum 4.

After positioning the wedge 2, the fixed cable drum 4 is correctly positioned for coupling to the drive member 5. The drive member 5 operates the cable drum 4 to drive the cable 7 to move the window 3 in the vehicle door 27. In this example, the drive member 5 is a motorized reducer, however it is to be understood that the drive member 5 can also be a crank-operated manual drive device. The coupling of the drive member 5 to the cable drum 4 can be done by any known means. In one example, the drive member 5 is a motorized reducer including a rotary-driven damper 11 as an output member. The rotary-driven damper 11 includes radial notches 12. Upon coupling of the drive member 5 to the cable drum 4, studs 13 of the cable drum 4 are received in the radial notches 12 of the rotary-driven damper 11. A driving torque can thus be transmitted from the drive member 5 to the cable drum 4 to drive the cable 7.

Figure 3:
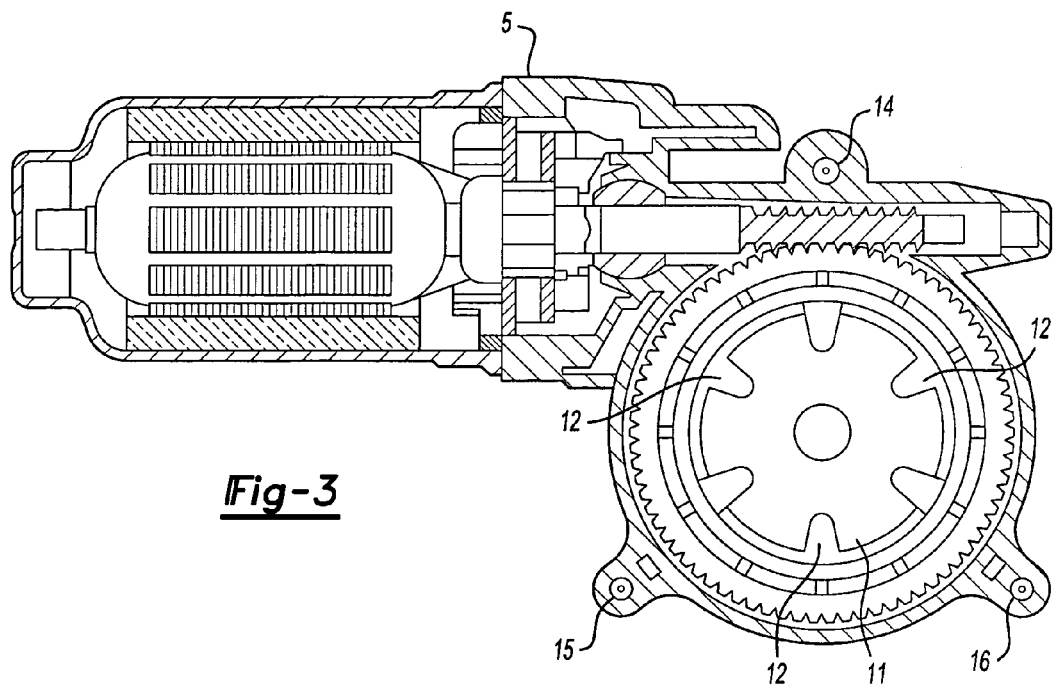
FIG. 3 shows a motorized reducer.

After coupling the drive member 5 to the cable drum 4, the drive member 5 is then at least partially fixed to an inner panel 17 of the vehicle door 27. In one example, as shown in FIG. 3, the casing of the drive member 5 includes bores 14, 15 and 16. Three screws pass through the bores 14, 15 and 16, fixing the drive member 5 to the inner panel 17. Seals can also be provided ground the screws to ensure water-tightness between the dry zone and damp zone of the vehicle door 27.

After at least partially fixing the drive member 5 to the inner panel 17, the wedge 2 is removed from the window guide structure 1. By employing the method of the present invention, the vehicle door 27 is devoid of plastic sheaths between the cable drum 4 and the cable deflection pulleys 9.

The wedge 2 is bent or curved to dispose the cable drum 4 proximate to its final transverse position. The cable drum 4 is mounted for rotation within a casing that includes a drum housing 20 and the drum supporting plate 21. The drum supporting plate 21 forms a shoulder and secures the cable drum 4 in the drum housing 20. The drum supporting plate 21 has an elongated part 22 projecting radially outward relative to the drum housing 20. The elongated part 22 is received in a clamp 23 that secures the cable drum 4 relative to the wedge 2 in the longitudinal, vertical and transverse directions. Friction of the elongated part 22 in the clamp 23 also provides security. The wedge 2 further includes an elongated part 24 that contacts the drum housing 20 to provide improved immobilization of the cable drum 4. The wedge 2 can also be adapted to secure the cable drum 4 by tension in the cable 7.

In one example, the wedge 2 allows deflection of the cable drum 4 in a direction transverse to the vehicle door 27, allowing the operator to easily re-engage the cable drum 4 with the drive member 5 to affect their coupling. The wedge 2 is sufficiently flexible to allow rotation about the vertical axis of the end securing the cable drum 4 to achieve this adjustment.

Alternately, the window guide structure 1 is inserted in a trough formed between the inner panel 17 and an outer panel 31 of the vehicle door 27. The window guide structure 1 is fixed to the panels by any suitable known means. If the drive member 5 is a motorized reducer, the drive member 5 is preferably fixed in the dry zone during coupling. The inner panel 17 and any other suitable element can ensure water tightness between the motor of the motorized reducer and the surroundings of the cable drum 4.

The wedge 2 allows the cable drum 4 to rotate. When the drive member 5 is rotated, cable drum 4 rotates to tighten the cable 7. The cable 7 is first positioned in the cable deflection pulleys 9 of the window guide structure 1. The wedge 2 is then positioned between the cable drum 4 and the guide frame 6, and the cable 7 is wound around the cable drum 4 to form the cable circuit. The drive member 5 is partially fixed to the inner panel 17 by pivotally mounting the drive member 5 about an axis staggered relative to the rotational axis of the cable drum 4. As could be appreciated from FIG. 3, the drive member 5 is partially fixed to the inner panel 17 by passing a screw through the bore 14, allowing the drive member 5 to pivot about this screw.

Figure 4:
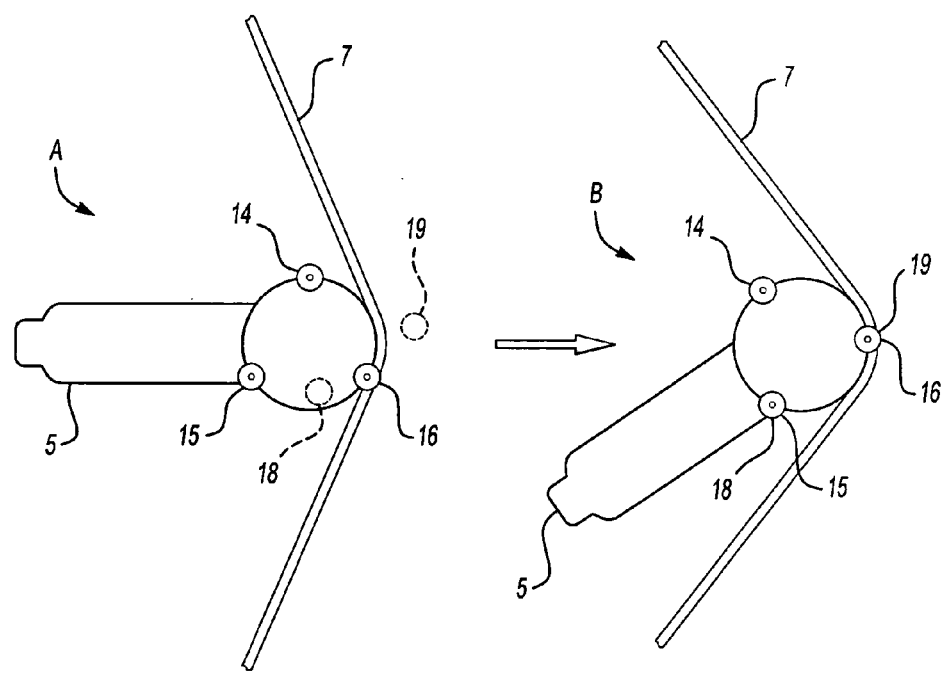
FIG. 4 shows an alternate mounting process of a drum to a drive member.

As shown in FIG. 4, when the drive member 5 is in position A, the bores 15 and 16 of the drive member 5 casing may be offset relative to corresponding screw threads 18 and 19, respectively, in the inner panel 17. At this position, the tension in the cable 7 is low, facilitating the assembly of the vehicle door 27. By rotating the drive member 5 to position B, the tension in the cable 7 is increased. The bores 15 and 16 in the drive member 5 are aligned with the respective screw threads 18 and 19 of the inner panel 17. Screws are received in the aligned bores 15 and 16 and the respective screw threads 18 and 19, fixing the drive member 5 to the inner panel 17 and increasing the tension in the cable 7.

Figure 5:
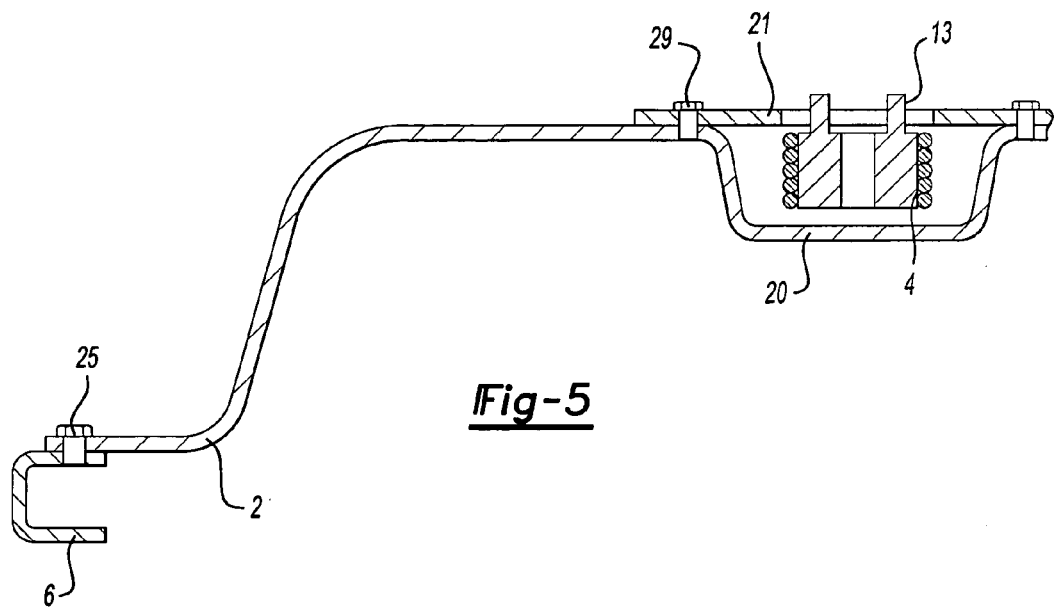
FIG. 5 shows a cross-sectional view of the window guide structure provided with an alternate wedge.
Figure 6:
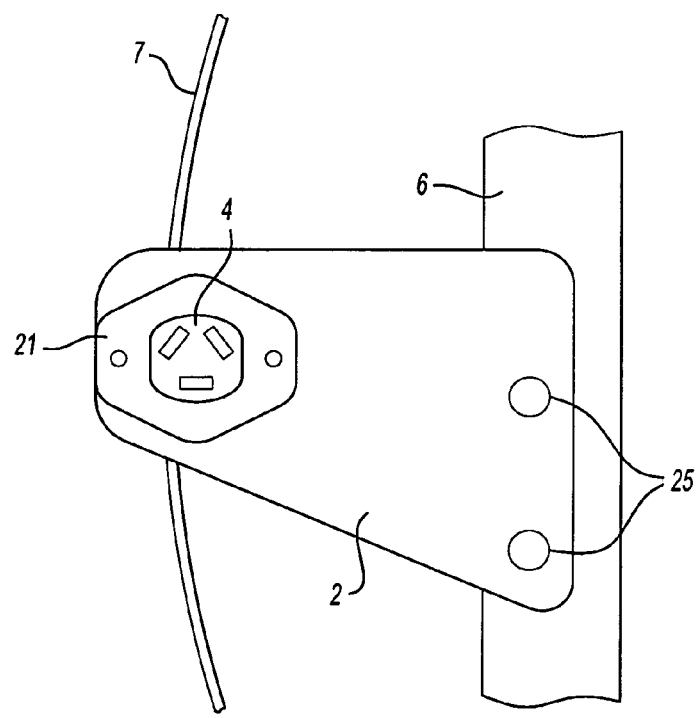
FIG. 6 shows a top view of the window guide structure of FIG. 5.

The above described wedge 2 is preferably removed after the drive member 5 is coupled to the cable drum 4. Alternately, as shown in FIGS. 5 and 6, the wedge 2 is not removed after the drive member 5 is coupled to the cable drum 4. The wedge 2 is secured to the guide frame 6 by studs fixed on the guide frame 6 or by screws 25 threaded into bores in the guide frame 6. Preferably, the wedge 2 is not rigidly fixed to the guide frame 6 so that the wedge 2 can slightly shift upon the assembly of the drive member 5, preventing squeezing of the studs or screws 25. As in the previous examples, the wedge 2 secures the cable drum 4 in a fixed position in the vertical and longitudinal directions, allowing an operator to correctly position cable drum 4 for coupling to the drive member 5. The wedge 2 can also be bent as in FIG. 1 or can allow deflection of the cable drum 4 in the transverse direction.

The wedge 2 of FIGS. 5 and 6 further includes an integrated drum housing 28. When the wedge 2 is fixed, the drum supporting plate 21 secures the cable drum 4 in the integrated drum housing 28 of the wedge 2. The drum supporting plate 21 is secured to the integrated drum housing 28 by attachment members 29. Alternately, the drum supporting plate 21 can be part of the wedge 2 and the integrated drum housing 28 can be added, such as shown in FIGS. 1 and 2. These variants reduce the number of parts in the vehicle door 27.

Of course, the present invention is not limited to the examples and embodiments described and represented, but it is subject to numerous variants open to the person skilled in the art. As one example, although the placement of the wedge in a slot in the window guide frame has principally been described, the wedge can also be positioned between a belt-line mask and the drum.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of assembling a vehicle door comprising the steps of:
   positioning a securing member between a window guide and a drum that drives a cable to immobilize said drum with respect to said securing member;
   winding said cable onto said drum;
   coupling a drive member to said drum once said drum is immobilized;
   at least partially fixing said drive member to the vehicle; and
   removing said securing member after the step of at least partially fixing said drive member to the vehicle door.

2. The method as recited in claim 1, wherein said drive member is at least partially fixed to an inner panel of the vehicle door.

3. The method as recited in claim 1, further comprising the step of inserting said window guide between an inner panel and an outer panel of the vehicle door.

4. The method as recited in claim 1, wherein said drum is secured in a vertical direction and a longitudinal direction by said securing member.

5. The method as recited in claim 1 wherein said securing member allows movement of said drum in a direction transverse to a plane of the vehicle door.

6. The method as recited in claim 1, wherein said window guide includes a frame provided with a window guide slot, and the step of positioning said securing member includes inserting said securing member in said window guide slot.

7. The method as recited in claim 6, further including a seal in said window guide slot, wherein said securing member is positioned between said seal and said drum.

8. The method as recited in claim 1, further comprising the steps of:
   placing said cable in at least one deflection pulley of said window guide prior to the steps of positioning said securing member and winding said cable;
   mounting said drive member pivotally about an offset axis offset relative to a rotational axis of said drum during the step of at least partially fixing said drive member;
   tensioning said cable by pivoting said drive member about said offset axis; and
   fixing said drive member to the vehicle door after the step of tensioning said cable.

9. The method as recited in claim 1 wherein said securing member is a wedge.

10. The method as recited in claim 1, wherein the step of at least partially fixing said drive member to the vehicle door includes utilizing at least one screw.

11. The method of claim 1, wherein the drive member is a motor fixed in a dry zone of the vehicle door.

12. The method as recited in claim 1, further including the step of fixing said securing member to said window guide.

* * * * *

UNITED STATES PATENT AND TRADEMARK OFFICE
CERTIFICATE OF CORRECTION

PATENT NO.       : 7,051,479 B2
APPLICATION NO.  : 10/392364
DATED            : May 30, 2006
INVENTOR(S)      : Chonavel et al.

It is certified that error appears in the above-identified patent and that said Letters Patent is hereby corrected as shown below:

ON THE COVER PAGE:

In Section (54), the title should read as the following:
--(54) METHOD OF ATTACHING A CABLE DRUM AND DRIVE TO A VEHICLE DOOR--

In Section (73), the Assignee should read as the following:
--(73) ArvinMeritor Light Vehicle Systems - France, Sully-sur-Loire (FR)--

IN THE CLAIMS:

In Claim 1, Column 5, Line 10 of the issued patent, insert --door-- after "vehicle" and before ";".

Signed and Sealed this

Tenth Day of October, 2006

JON W. DUDAS
*Director of the United States Patent and Trademark Office*